E. B. STACK.
COMBINED TRANSFORMER AND RECTIFIER.
APPLICATION FILED JULY 22, 1918.
1,316,546.
Patented Sept. 16, 1919.
3 SHEETS—SHEET 3.
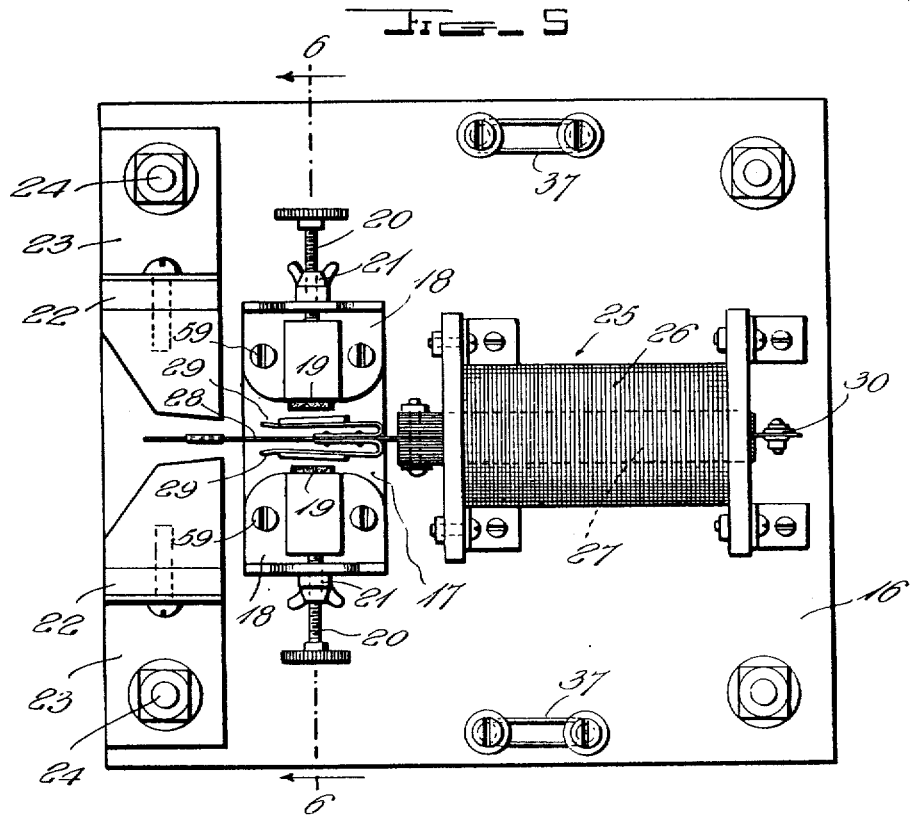
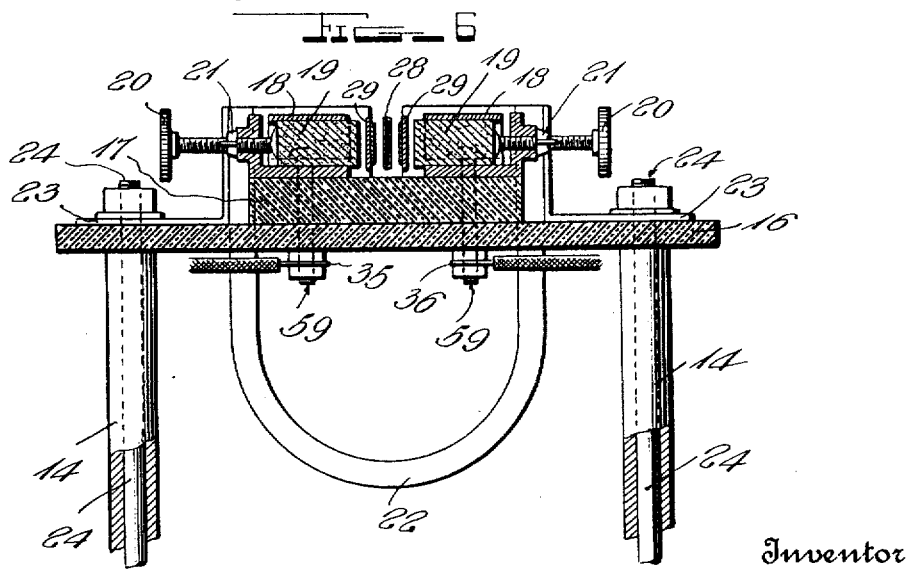
Witness
Inventor
E. B. Stack
By H. B. Willson &co
Attorneys

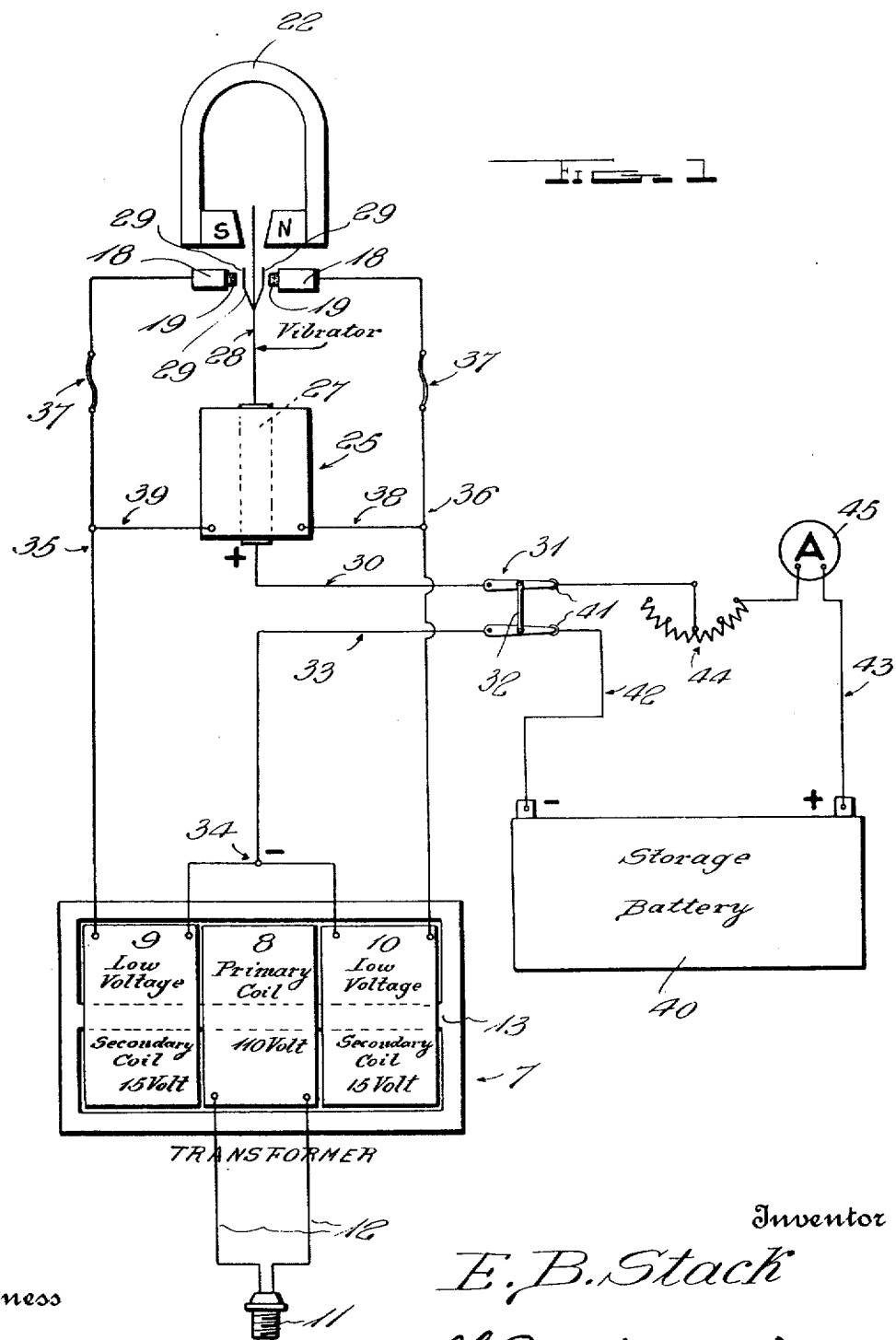

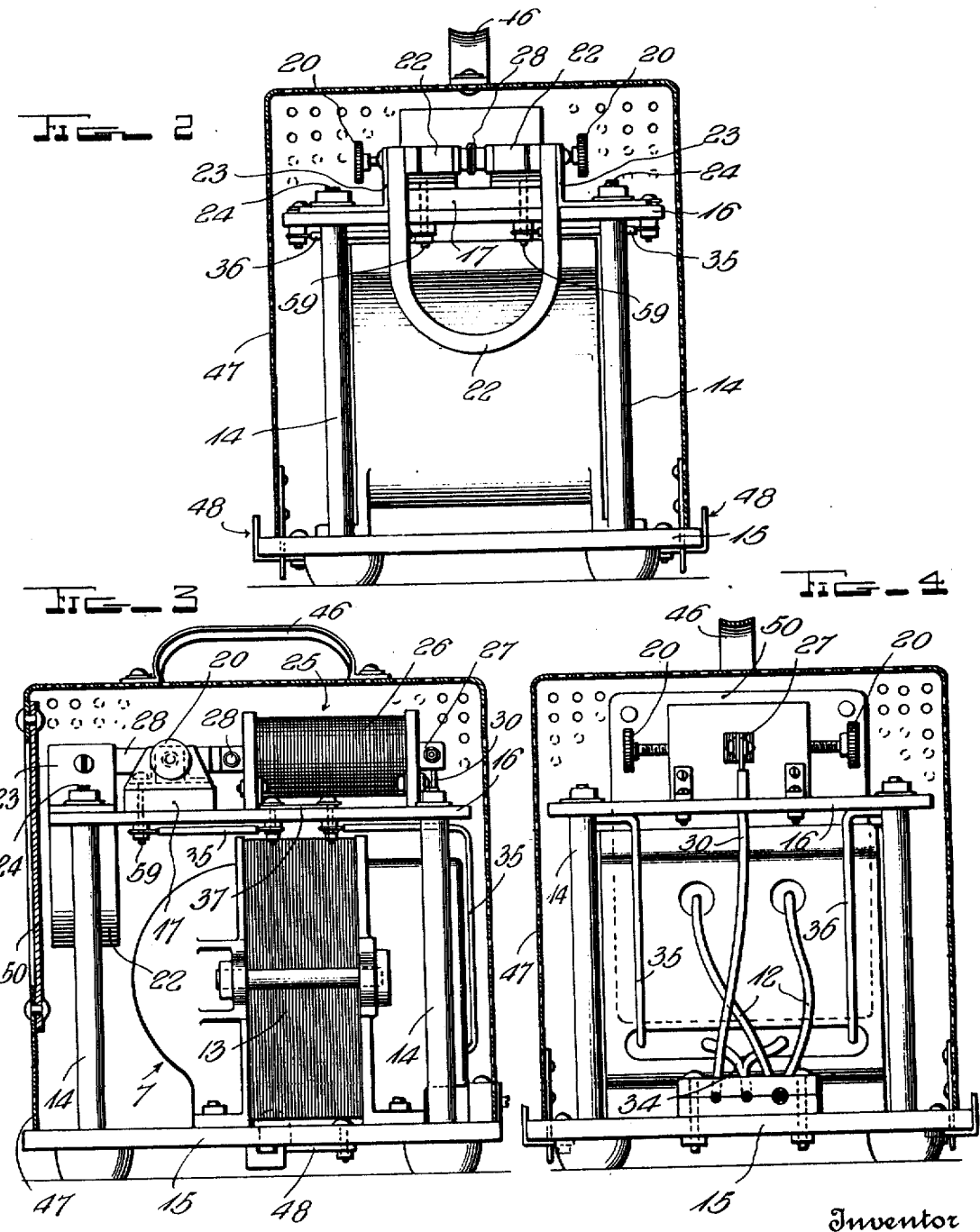

UNITED STATES PATENT OFFICE.

ERVIN B. STACK, OF MONROE, NORTH CAROLINA.

COMBINED TRANSFORMER AND RECTIFIER.

1,316,546.  Specification of Letters Patent.  Patented Sept. 16, 1919.

Application filed July 22, 1918. Serial No. 246,084.

*To all whom it may concern:*

Be it known that I, ERVIN B. STACK, a citizen of the United States, residing at Monroe, in the county of Union and State of North Carolina, have invented certain new and useful Improvements in Combined Transformers and Rectifiers; and I do declare the following to be a full, clear, and exact description of the invention, such as will enable others skilled in the art to which it appertains to make and use the same.

This invention relates to a combined magnetic transformer and rectifier, and it relates more particularly to an improved compact portable device for transforming and rectifying a current of electricity and charging a storage battery or other translating device with the transformed and rectified current.

One object of this invention is to provide a thoroughly practical transformer and rectifier which is portable and may be carried by hand or in an automobile as a single unit from one source of E. M. F. to another, so that the storage battery of the automobile can be charged at any place where an ordinary electric lamp-socket is accessible.

A further object of this invention is to provide a device of this character whereby a high voltage alternating current may be employed to charge a storage battery, by converting this current into a direct current of low voltage.

A further object of the invention is to shunt a part of the low voltage or transformed current and utilize the same for changing the polarity of an electromagnet-core with the same frequency of the alternating current, and thereby changing the polarity of a vibrator which operates between two opposing contacts and coöperates therewith to rectify the current, and also constitutes an element of the conductor that connects the transformer with the storage battery to be charged.

Another object of the invention is to interpose fuses in the circuit between the shunt and the vibrator so as to obtain the maximum safety of the vibrator.

Other objects and advantages may become apparent to persons who read the following details of description in connection with the accompanying drawings in which:

Figure 1 is a diagrammatic view of my improved transforming and rectifying device in connection with a storage battery;

Fig. 2 is a front elevation of the device, the casing being shown in vertical section;

Fig. 3 is a side elevation, the casing in vertical section;

Fig. 4 is an end elevation, the casing in vertical section;

Fig. 5 is a top plan, the casing being omitted; and,

Fig. 6 is an enlarged detail view in vertical section along the line 6—6 of Fig. 5.

Referring to these drawings in detail, in which similar reference characters correspond to similar parts throughout the several views, and especially to Fig. 1, the numeral 7 represents generally a transformer consisting of a primary coil 8 and two secondary coils 9 and 10, the primary coil being located between the secondary coils and being connectible to an ordinary lamp-socket through the medium of a plug 11 and connections 12. These coils surround a core 13 through the medium of which a current is induced in the secondary coils by the primary coil, the windings of the primary coil being so related to those of the secondary coils that a high voltage (say 110 v.) in the former induces a relatively low voltage (say 15 v.) in the latter.

The transformer is arranged in a suitable frame which comprises uprights or posts 14, a base or lower supporting plate 15, and an upper supporting plate 16, both plates being preferably of insulating material. Upon the plate 16 is disposed a slab 17 of slate or other fire proof insulation, and on this slab is secured a pair of holders and adjusters 18, each of which carries a carbon contact 19, these contacts being adjustable by means of screws 20 which are provided with lock-nuts 21 that hold them in adjustment.

Adjacent to the contact holders 18 is a permanent magnet 22 of the horse-shoe type that is supported on and secured to the plate 16 by means of corner-brackets 23. The magnet 22 is relatively long and narrow, and extends through slots in one edge of the plate 16, and its poles project above the plate 16 while its bight portion extends below this plate; and by this arrangement, the combination of elements is rendered very compact. Bolts 24 extend up through the tubular posts or uprights 14 and coöperate with nuts thereon for securing the parts of the main frame together and for securing the brackets 23 in place.

An electro-magnet 25 is secured on the plate 16 and consists of a coil 26 and a laminated core 27, the latter being preferably formed of soft iron strips bolted together as shown in Fig. 5.

The vibrator 28 is secured to one end of the core 27 and extends between the carbon contacts 19 and the poles of the permanent magnet 22. This vibrator preferably consists of a spring steel strip provided with laterals 29 that are also of steel and are quite flexible and resilient so as to cushion the strokes of the vibrator, and each element 29 is provided with a copper contact plate that makes and breaks circuit with the corresponding contacts 19. The other end of the core 27 has a conductor 30 connected thereto and this conductor is also connected to one arm of a switch 31 which has its arms connected by a non-conducting connector 32. The other arm of this switch is connected to the secondary coils 9 and 10 through the medium of a conductor 33 which is branched or divided at 34 as shown in Fig. 1. Conductors 35 and 36 connect the corresponding brushes 19 with the secondary coils, and each of these conductors has a fuse 37 interposed therein at a safe distance from the coil 26 and vibrator 28, so as not to detrimentally affect these parts when the fuse blows out.

Conductors 38 and 39 combine with the coil 26 to form a shunt across the secondary circuit, viz., the circuit which comprises the secondary coils 9 and 10, brushes 19 and conductors 35 and 36; and the alternating current flows alternately in opposite directions through this shunt and changes the polarity of the core 27 and armature or vibrator 28 with each alternation of the current so that the vibrator is attracted alternately by the N. and S. poles of the permanent magnet 22.

A storage battery 40 is connected to stationary contacts 41 through the medium of conductors 42 and 43, the latter having a rheostat 44 and an ammeter 45 interposed therein.

Considered broadly, the secondary coils 9, 10, and the branch wire or connection 34, being directly connected in series, may properly be termed a conductor having the conducting elements 35 and 36 as its terminal portions, including the fuses 37 and the terminal contacts 19; also, the conducting elements 33, 31, 42, 40, 43, 45, 44, and 30, being directly connected in series with one another and with the core 27 and vibrator 28, may be properly termed a conductor, and this latter conductor is connectible in parallel with that which includes the secondary coils, through the medium of the vibrator. The coil 26 combines with the shunt wires 38 and 39 to form a conductor which is continually connected in parallel with the conductor which includes the secondary coils.

In operation, assuming that an alternating current of 110 v. is carried by the primary coil 8, and that the secondary coils 9 and 10 have alternating currents of 15 v. each induced by the primary coil through the medium of the core 13; now, assume that an oscillation of the current from the secondary coils is following along the wire 35 toward the magnet 22; the shunt wires 39 and 38 conduct a part of the current through the coil 26, and the circuit is completed through the wire 36 and the branch conductors that meet at 34. This current through the coil 26 excites and polarizes the core 27 and armature 28 and the magnet 22 attracts it according to its polarity, say with positive or north polarity, whereby the south pole of the magnet 22 draws the vibrator into electrical contact with the carbon 19 that is in connection with the wire 35, thereby closing the circuit between the secondary coils and the battery, through the medium of the conductor elements 35, 37, 19, 28, 27, 30, 31, 41, 44, 45, 43, 42, 33 and 34. Now the next succeeding oscillation of the current in the coils 9 and 10 flows along the wire 36 toward the magnet 22, and passes through the coil 26 in the direction opposite to that described in the foregoing, thereby changing the polarity of the core 27 and armature 28, so that the latter is now drawn by the north pole of the magnet 22 into electrical contact with the conductor 36, so that the current now ceases to flow from the conductor 35 to the armature, but flows thereto from the conductor 36, the direction of flow through the armature being direct at all times.

Referring now to the specific construction and arrangement of parts it will be seen by reference to Figs. 2 to 6 inclusive, that the transformer and rectifier are arranged very compactly in a unitary device that can be carried by hand from place to place, a handle 46 being provided on a casing 47 which protects the electrical conductors and other elements while guarding the operator and other persons against electric shocks. The casing is reticulated for the purpose of allowing the escape of any heat that may be generated therein. Any suitable means, as indicated at 48, may be employed for removably securing the casing to the main frame.

Referring to Fig. 6 it will be seen that the conductors 35 and 36 are connected to the carbons 19 through the medium of screws or binding posts 59 which also serve to secure the carbon holders 18 to the main frame. In Figs. 1, 3 and 6 it will be seen that the fuses 37 are disposed on top of the plate 16, and between the contacts 19 and shunt wires 38 and 39. This is not only convenient in replacing fuses, but also minimizes the danger of overcharge at the contacts 19. The location of the fuses on the outer edges of the plate 16, remote from the coil 26 and insulated from the transformer, by the plate 16, obviates any detriment to the transformer by the blowing out of the fuses.

In order that the magnet 22 shall not be detrimentally affected by its proximity with the casing, I provide a plate 50 of zinc or other diamagnetic material, and I may eliminate a portion of the magnetic material of the casing opposite to this magnet.

Although a storage battery is described and shown in this embodiment of my invention it is to be understood that my invention is not limited to the combination with this particular form of translating device, nor to the construction and arrangement of parts as specifically described in the foregoing, but I am entitled to modify my invention within the scope of the inventive idea disclosed in the foregoing description and following claims:

What I claim as my invention is:

1. In an electric current rectifier, an alternating current conductor, comprising a pair of terminal contacts, a second alternating current conductor, said second conductor including a magnetizing coil and being connected in parallel with the first said conductor, a horseshoe magnet, and a direct current conductor including a magnetizing core and a vibrator and being connectible in parallel with the first said alternating current conductor by means of said vibrator, said vibrator constituting a flexible extension of said core and projecting between the said terminal contacts and between the poles of said magnet, the said core being coöperative with said coil to change the polarity of said vibrator.

2. In a combined transformer and rectifier, an alternating current primary coil, an alternating current conductor including a secondary coil and a pair of terminal contacts, an alternating current shunt including a magnetizing coil, a horse-shoe magnet, and a direct current conductor, said primary coil being associated with said alternating conductor so as to induce a current of lower potential therein, said shunt being in parallel with said alternating current conductor, said direct current conductor including a magnetizing core and a vibrator, said vibrator being supported by said core and extending between said terminal contacts and between the poles of said magnet and adapted to connect with said contacts, said coil and core being coöperative for changing the polarity of said vibrator.

3. A combined transformer and rectifier comprising an insulating plate, transformer coils, means supporting said transformer coils and supporting said insulating plate horizontally over said coils, a pair of opposing contacts on the top side of said plate, a bi-pole magnet supported by said plate, a conducting coil supported on the upper side of said plate, a core through said conducting coil, a vibrator supported by said core and extending between said contacts and between the poles of said magnet, conducting wires electrically connecting said transformer coils with said opposing contacts, means electrically connecting said conducting wires with said conducting coil, and conducting means whereby said core and said trasformer coils may be electrically connected to a translating device.

4. A combined transformer and rectifier comprising an insulating plate, transformer coils, means supporting said transformer coils and supporting said insulating plate horizontally over said coils, a pair of opposing contacts on the top of said plate, a relatively long and narrow bi-pole magnet supported by said plate and extending vertically above and below said insulating plate, a conducting coil supported on the top side of said plate, a core through said conducting coil, a vibrator supported by said core and extending between said contacts and between the poles of said magnet, conducting wires electrically connecting said transformer coils with said opposing contacts, means electrically connecting said conducting wires with said conducting coil, and conducting means whereby said core and said transformer coils may be electrically connected to a translating device.

5. In a combined transformer and rectifier, an insulating and supporting plate, a relatively long and narrow bi-pole magnet extending longitudinally through one edge of said plate, a conducting coil supported on one side of said plate, a pair of opposing contacts between said conducting coil and the poles of said magnet, a core extending through said conducting coil, a vibrator supported by one end of said core and extending between said opposing contacts and the poles of said magnet, transformer coils on the opposite side of said insulating and supporting plate and secured thereto, conductors electrically connecting said transformer coils with said opposing contacts, conductors electrically connecting the terminals of said conducting coil respectively with the first said conductors, and conductors electrically connecting said core with said transformer coils through the medium of a translating device.

6. In a portable device for transforming and rectifying an electric current, an insulating and supporting plate, transformer coils on one side of said plate and fixed with relation thereto, a rectifying vibrator on the other side of said plate, a magnet extending transversely of said plate and supported thereby and effective to actuate said vibrator, conducting means electrically connecting said vibrator and translating coils in a manner to effect the transforming and rectifying of an electric current flowing therealong, a casing to contain and protect the elements above named, and a diamagnetic plate between said magnet and said casing.

7. In a portable device for transforming and rectifying an electric current, an insulating and supporting plate, transformer coils on one side of said plate and fixed with relation thereto, a rectifying vibrator on the other side of said plate, a magnet extending transversely of said plate and supported thereby and effective to actuate said vibrator, pairs of binding posts extending through said plate adjacent opposite edges, a fuse for each pair of said binding posts and connected thereto and disposed on the same side of the plate with said vibrator and at a safe distance from the latter, conductors electrically connecting one binding post of each pair with said transformer coils, conducting means electrically connected to the other binding post of each pair and terminating at opposite sides of said vibrator and adapted to be alternately in and out of contact therewith, and conducting means electrically connecting said transformer coils to said vibrator.

In testimony whereof I have hereunto set my hand.

ERVIN B. STACK.

Witnesses:
HENRY BELK,
G. E. FLOW.